Patented Apr. 21, 1953

2,636,051

UNITED STATES PATENT OFFICE 2,636,051

PREPARATION OF DIAMINE

Richard R. Whetstone, Berkeley, and Seaver A. Ballard, Orinda, Calif., assignors to Shell Development Company, San Francisco, Calif., a corporation of Delaware No Drawing. Application April 5, 1948, Serial No. 19,186

6 Claims. (Cl. 260—584)

This invention relates to a process for the preparation of long-chain aliphatic diamines and to new diamines which may be produced by the process. More particularly, the present invention relates to a process for the preparation of aliphatic diamines wherein the amino groups are separated by at least six carbon atoms by a process based upon conversion of aliphatic dialdehydes wherein the formyl groups are separated by at least four carbon atoms to the desired products by treatment with ammonia or monoamines and with hydrogen under selected conditions conducive to hydrogenation and amination reactions. In a specific embodiment, the invention pertains particularly to a process for the preparation of certain aliphatic diamines wherein the amino groups are separated by six carbon atoms and wherein one of the carbon atoms adjacent in the chain to an amino-substituted carbon atom bears a hydroxyl substituent group, by the treatment of a suitable hydroxy-substituted aliphatic dialdehyde, and to the novel and valuable products thereby obtained.

One of the known methods of preparing lower aliphatic monoamines, especially alkyl amines, such as ethylamine, the propyl amines, etc., comprises treating under certain conditions a lower saturated aliphatic aldehyde such as acetaldehyde, propionaldehyde, or a butyraldehyde, with ammonia or a primary or secondary amine, and hydrogenating the products formed by the treatment. According to an embodiment of the process that has been described, the aldehyde is treated in the presence of a suitable solvent, such as a lower aliphatic alcohol, or a glycol, with ammonia in an amount substantially equal to, or at most only slightly greater than, the amount theoretically required to react with the aldehyde. The mixture thus formed is subjected to the action of hydrogen gas under hydrogenating conditions in the presence of a hydrogenation catalyst, presumably effecting hydrogenation of an intermediate product to the desired alkyl amine or a mixture of alkyl amines. Representative disclosures of processes of this general character for the preparation of alkyl amines may be found in, for example, the following United States patents: No. 2,219,879, No. 2,278,373, No. 2,373,705, No. 2,278,372.

The long-chain alpha,omega aliphatic diamines, particularly those wherein the amino groups are separated by six or more carbon atoms, have been found, in contrast to the lower aliphatic monoamines that may be produced according to the above known processes, to be of particular value in certain fields of use in which the lower aliphatic mono-amines are of little or no value. It therefore has been desirable to obtain effective methods for the preparation of these long-chain aliphatic diamines whereby they may be produced at reasonable cost from readily available raw materials.

One potential source of raw materials for the preparation of these long-chain alpha,omega aliphatic diamines is the aliphatic dialdehydes which contain six or more carbon atoms and wherein the formyl groups are separated by at least four carbon atoms, preferably by from four to eight carbon atoms. However, it is essential, to make this source of raw materials practicably useful, to be capable of converting the dialdehydes in as direct a manner as possible to the desired diamines; i. e., by a route involving the minimum of intermediate steps or reactions which would increase the cost of such conversion or reduce the yield of the desired product. It could a priori appear that these long-chain dialdehydes could be easily converted by the prior art processes such as those mentioned above, to the desired long-chain aliphatic diamines. However, the desired conversion has been found to involve unique problems which are not encountered with the aliphatic monoaldehydes and which render the prior art processes disadvantageous for effecting the desired conversion. The long-chain aliphatic dialdehydes, especially those wherein the formyl groups are separated by four carbon atoms, have been found to differ critically in several respects from the lower aliphatic aldehydes such as acetaldehyde, etc., which heretofore have been subjected to reaction with an aminating agent and with hydrogen to produce alkyl amines. One important difference is the strong tendency of the dialdehydes to form with the aminating agent cyclic nitrogenous products wherein carbon atoms derived from the dialdehyde are present in a ring. As far as we know, such a tendency has not been observed in the case of the aliphatic saturated monoaldehydes. A further difference resides in the tendency of long-chain dialdehydes and the corresponding diamines to form undesired polymers and interpolymers with each other, possibly a result of the bifunctional character of the carbonylic reactant and the amino reaction product. It will be apparent that the greater the proportion of the dialdehyde that is converted to such nitrogenous cyclic compounds or polymers or interpolymers, the lower will be the efficiency of the process for obtaining the desired open-chain aliphatic diamine. These considerations apply with particular force when, as in one embodiment of the present invention, there is present in the molecule of the dialdehyde a third group, such as the hydroxyl group, which, under the proposed conditions of execution of a process, is potentially capable of reacting either intramolecularly or intermolecularly with reactive positions on either reactants, intermediates, or products of reaction, or which would be capable of being split-off with resultant formation of undesired products.

Accordingly, one of the objects of the present invention is an effective method for the preparation of alpha,omega saturated aliphatic diamines wherein the amino groups are separated by at least six carbon atoms, from the aliphatic saturated aldehyde containing the same number of carbon atoms, that is, containing the same carbon skeletons, by treatment of said dialdehyde with ammonia or a primary or secondary organic amine and with hydrogen under hydrogenating conditions. Another object of the invention is selected conditions and procedure whereby such treatment may be effected with good yields of the desired alpha,omega diamine. A further object of the invention is a method, and conditions and procedure, for the conversion of certain hydroxylated dialdehydes to valuable new hydroxylated aliphatic amines. Yet another object of the invention is these new compounds and products themselves. Still other objects of the invention will become apparent hereinafter.

Broadly stated, the invention comprises the discovery of suitable conditions and procedure whereby aliphatic dialdehydes containing at least six carbon atoms and preferably from six to twelve carbon atoms, and wherein the formyl groups are separated by at least four carbon atoms, may be converted by treatment with ammonia or a primary or secondary amine and with hydrogen in the presence of a hydrogenation catalyst and under hydrogenating conditions, to alpha,omega aliphatic saturated diamines which contain the same carbon skeleton and the same number of carbon atoms as the dialdehyde but which may or may not be further substituted at the nitrogen atoms depending upon the character of the nitrogenous reactant employed in the execution of the process of the invention. The invention more specifically comprises the conditions and manipulative procedures whereby hydroxylated long-chain aliphatic dialdehydes, such as hydroxylated adipaldehyde, may be converted without excessive formation of cyclized products or polymers, to valuable hydroxylated aliphatic amines.

When reference is made herein to saturated aliphatic dialdehydes containing at least six carbon atoms, preferably from six to twelve carbon atoms, wherein the formyl groups are separated by an uninterrupted chain of at least four carbon atoms, representative aldehydes referred to include among others, adipaldehyde, pimelaldehyde, suberaldehyde, azelaaldehyde, sebacaldehyde, beta,beta-dimethyladipaldehyde, alpha-methal-delta-isopropyladipaldehyde, and their analogs and higher homologs in the alkanedial series of dialdehydes. The word "saturated" in the expression "saturated aliphatic dialdehydes" means that the dialdehyde contains (except for the carbon-to-oxygen unsaturation of the two formyl groups) only saturated linkages, or bonds. The process of the invention is of particular value as applied to such dialdehydes wherein the formyl groups are separated by four carbon atoms, i. e., to adipaldehyde and to suitable substitution products of adipaldehyde. One of the particular advantages of the process of the invention is that it makes possible the preparation of valuable diamines from derivatives of dialdehydes, which derivatives contain a potentially reactive group in addition to the two formyl groups, without excessive reaction at said potentially reactive group. One group of such derivatives comprises the hydroxylated dialdehydes wherein the formyl groups are separated by at least four carbon atoms, that is, long-chain aliphatic dialdehydes of the herein described character wherein one or more of the carbon atoms of the chain bears a hydroxyl substituent group, particularly the monohydroxylated adipaldehydes, including those wherein the hydroxyl group is attached to one of the carbon atoms of the chain of carbon atoms connecting the two formyl groups. In the practice of this preferred embodiment of the invention, it has been discovered that valuable new hydroxylated aliphatic amines may be prepared by employing in the process a mono-hydroxy-adipaldehyde wherein the hydroxyl group is in the alpha position to one of the formyl groups, i. e., the hydroxyl-substituted adipaldehydes having the general formula

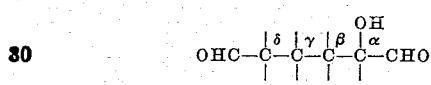

in which the free bonds at the carbon atoms marked $\alpha$, $\beta$, $\gamma$ and $\delta$ are attached to either hydrogen atoms or to alkyl groups. A subgroup of hydroxylated dialdehydes which may be converted to valuable hydroxylated aliphatic amino compounds with especial advantage according to the process of the invention comprises those which correspond to the above general formula containing from six to twelve carbon atoms and only saturated carbon-to-carbon bonds, i. e., alpha-hydroxyadipaldehyde and lower alkyl substitution products thereof.

As the aminating agent, there may be employed ammonia or any amine having at least one unsubstituted hydrogen atom attached to the amino nitrogen atom, the selection of the aminating agent being governed by the substituent or substituents, if any, that are desired to be bonded to the amino nitrogen atoms of the long-chain diamine produced in the process. For example, with ammonia, diprimary long-chain diamines are produced, that is, diamines wherein both nitrogen atoms are primary amino nitrogen atoms; with primary organic amines disecondary long-chain diamines are produced; and with secondary amines, ditertiary long-chain diamines are produced. Illustrative aminating agents include, in addition to ammonia, the alkyl amines such as methylamine, ethylamine, isopropylamine, the butyl amines, the pentylamines, the hexylamines, octylamines, decylamines, stearylamine, myristyl amine, behenylamine, laurylamine, diethylamine, N-methylethylamine, N-methylbutylamine, N-butylpentylamine, diisopropylamine, N-methylstearylamine, dilaurylamine, N-isopropylisobutylamine, cyclohexylamine, dicyclohexylamine, aniline, N-methylcyclopentylamine, N-ethylaniline, trimethylenediamine, benzylamine, the naphthylamines, piperidine, the aminopyridines, ethanolamine, butanolamine, isobutanolamine, ethyl aminoacetate, and other primary and secondary amines. If desired, olefinic or acetylenic amines may be employed, e. g., allylamine, diallyl amine, propargyl amine, etc. However, since saturation of the olefinic or acetylenic bonds may occur, it ordinarily is preferable to employ amines which contain only saturated carbon-to-carbon bonds and/or aromatic carbon-to-carbon bonds in the molecule. In lieu of the amines per se, there may be employed substances which under the reaction conditions are transformed to the desired amine, e. g., nitro derivatives of alkanes or of aryl hydrocarbons, nitriles, etc.

The process of the invention is executed with the aid of a hydrogenation catalyst. As the hydrogenation catalyst, it is essential that there be selected one which does not promote excessive occurrence of undesired side reactions, but that still is sufficiently active to favor the desired reaction. The catalyst also desirably is one that may be prepared easily and at a reasonable cost, and that may be reactivated or regenerated in a reasonable manner. The catalysts which are selected also desirably are catalysts which retain their activity well under the conditions of use. It has been discovered in accordance with the invention that the metal hydrogenation catalysts comprise suitable hydrogenation catalysts. There may be employed as the hydrogenation catalyst, for example, nickel, iron, cobalt, copper, vanadium, tungsten, chromium, platinum, molybdenum, palladium, ruthenium, and the like or mixtures or alloys of the same. The base metal hydrogenation catalysts are preferred because of their high efficiency and low cost, and because of their minimal tendency to promote undesired side reactions under the conditions of execution of the process of the invention. An especially desirable group of catalysts, which are easily prepared, which have a high initial and a favorably selective activity, and which retain their activity admirably under conditions of use in the process comprises the finely divided pyrophoric base metal hydrogenation catalysts, such as finely-divided pyrophoric cobalt, iron, and nickel. The active nickel catalyst known to the art as Raney nickel catalyst is particularly desirable. The hydrogenation catalyst may be used in finely divided state, suspended or dispersed in the reaction medium, or it may be supported on an inactive or active supporting material, such as alumina, silica, kieselguhr, carbon, clay etc. The amount of the hydrogenation catalyst that is employed in the practice of the process of the invention generally may be from about 1% to about 20% by weight of the reaction mixture, although more or less may be employed if desirable.

It has been discovered that with the highly reactive dialdehydes that are employed in the process of the invention, particularly the hereinbefore described hydroxylated dialdehydes, the procedure that is employed has a pronounced effect upon the results that are obtained. In order to obtain the desired results it is essential in accordance with the invention to minimize, insofar as feasible, contact of the dialdehyde with either or both the aminating agent and the hydrogen, under conditions other than those which lead to the desired reaction. According to the invention, the process therefore is executed in such a manner that contact of the dialdehyde reactant with either or both the amine reactant and the hydrogen under conditions other than those which lead to the desired reaction is substantially avoided. According to a preferred procedure of the invention, the amino reactant, i. e., the ammonia or the primary or secondary organic amine, is placed in a suitable reaction vessel, or reaction zone. If the amine reactant is normally gaseous, it may be introduced under pressure, as to maintain a liquid phase, or, less desirably, a suitable solvent, such as water or an alcohol, may be present in the reaction zone to maintain a liquid phase. The hydrogenation catalyst also is disposed in the reaction vessel, or zone, in the desired amount.

After the introduction of the aminating agent and the hydrogenation catalyst into the reaction vessel, the vessel may be closed and hydrogen introduced thereinto at a pressure suitable for the further execution of the process. Hydrogen pressures sufficient to produce total pressures from about 200 pounds per square inch to about 5000 pounds per square inch are effective, a preferred range being from about 500 pounds per square inch to about 2000 pounds per square inch. While the hydrogen pressure is maintained within the aforesaid range, additional hydrogen being supplied when and if required, the dialdehyde to be treated is introduced at a controlled rate into the reaction vessel. In order to minimize exposure of an unreacted excess of the dialdehyde to the reaction mixture and conditions, the dialdehyde is introduced at a controlled rate such that a substantial accumulation at any time of unreacted dialdehyde in the reaction mixture is precluded, i. e., the dialdehyde is introduced at a rate not substantially greater than the rate of its consumption in the ensuing reaction. The dialdehyde may be added to the reaction mixture continuously or intermittently, and it may be added in either the pure state, as when it is liquid, or it may be added in the form of a solution in an inert solvent, such as water, a lower alcohol, a glycol, or the like. During the addition of the dialdehyde, the temperature of the reaction mixture must be maintained within controlled limits. This is because at excessively high temperatures, e. g., temperatures substantially above 150° to 170° C., polymerization, decomposition, or other undesired reactions may set-in to the detriment of the desired results. On the other hand, at low temperatures, that is temperatures substantially below ordinary room temperatures, the reaction or reactions tend to be too slow for practical operations. Temperatures of from about 30° C. to about 150° C., are suitable in the execution of the process of the invention. A preferred range is from about 50° C. to about 125° C. Cooling and/or heating means may be provided to enable regulation and control of the temperature of the vessel and its contents. During addition of the dialdehyde to the reaction mixture, the contents of the reaction vessel desirably are agitated to afford intimate contact between the reactants, the hydrogenation catalyst, etc.

In accordance with the invention, the amount of the aminating agent, i. e., the ammonia or primary or secondary amine, that is employed, is such that there is present at all times a large amount over the amount that is theoretically required in the reaction. In essence, this excess amount of the aminating agent serves as a solvent in the reaction medium, and by its presence favorably influences the outcome of the process. When ammonia is employed as the aminating agent, the objects of the invention are accomplished by having present at all times during the reaction an amount of ammonia in moles at least ten times the amount of the dialdehyde added. Preferably there is employed an amount of ammonia corresponding in moles to at least twenty times the amount of the dialdehyde. The use of small amounts of ammonia has been found to result in the predominant formation of products markedly different from those that are desired in accordance with the invention, and therefore is avoided. The maximum amount of ammonia that is employed is not critical; an amount (in moles) one hundred times the amount of the dialdehyde is a convenient maximum. When ammonia is employed as the aminating agent, a particularly efficacious range is from about 20 moles to about 70 moles of ammonia per mole of the dialdehyde. With amines, such as primary or secondary organic monoamines, similar ranges of proportions generally apply, for example, from about ten to about 100 moles of amine per mole of dialdehyde. All of the aminating agent may be added initially to the reaction vessel, or a part may be added initially and the balance added during the addition of the dialdehyde, at such a rate that a substantial excess of the aminating agent is maintained at all times in the reaction zone.

The conversion of the long-chain dialdehyde to the desired long-chain aliphatic diamine ordinarily will have been largely completed upon completion of the introduction in the above-described controlled manner of the dialdehyde into the reaction mixture. In order to obtain maximum conversion of the dialdehyde introduced to the desired amino product, it may be desirable to maintain the mixture after all of the dialdehyde has been added, under hydrogenating conditions for an additional period of time. For example, after the addition of the aldehyde has been completed, the mixture may be held under the above-described conditions of temperature and hydrogen pressure for a period of time of one to several hours, and then removed from the reaction zone for separation of the desired product from the mixture. The required time for the reaction will depend in part upon the activity of the hydrogenation catalyst, the reactants that are used, and the particular reaction conditions. Reaction times of from about 0.5 to 5 hours are generally suitable, although longer or shorter times may be used if desirable.

The process of the present invention may be executed in either a batchwise, an intermittent, or a continuous manner. For batchwise operations, a suitable reaction system would comprise a pressure-resistant reaction vessel provided with the necessary inlets and outlets, means for agitating the contents, and means for adjusting and maintaining the temperature of the reaction mixture at a desired value. For intermittent or continuous operations, the hydrogenation catalyst may be disposed in a suitable reaction vessel or zone, and the aminating agent and the long-chain dialdehyde passed into contact therewith in the above-stated proportions and under the hereinbefore described hydrogenating conditions. Unreacted aminating agent may be recovered from the final reaction mixture and recycled through the process with fresh feed.

After the reaction is completed, the reaction mixture may be worked up in any suitable manner to recover the desired products. The catalyst may be removed by filtration, centrifugation, or other suitable means. The excess aminating agent may be recovered for reutilization. The desired diamine may be recovered and/or purified according to known procedures, e. g., by conversion to a salt and crystallization of said salt, by fractional distillation, by treatment with selective solvents, or the like.

In summary, the invention comprises conditions and procedures suitable for effecting reaction between the highly reactive long-chain aliphatic dialdehydes and aminating agents and hydrogen, to produce valuable long-chain diamines while avoiding the excessive formation of products formed by cyclization of the dialdehyde or intermediates formed therefrom in the reaction mixture, by polymerization, by decomposition, or by other undesired side reactions. Valuable products that may be produced according to the process of the invention include 2-hydroxy-1,6-hexanediamine and N-substitution products thereof wherein at least one of the hydrogen atoms attached to an amino nitrogen atom is or are replaced by a suitable hydrocarbon group or groups. Especially valuable compounds are those in which hydrocarbon group is a straight- or branched-chain alkyl group, preferably one containing from 1 to 18 carbon atoms. When a secondary alkylamine is employed as the aminating agent in the process of the invention and the dialdehyde is 2-hydroxyadipaldehyde, valuable N,N,N',N'-substituted 2-hydroxy-1,6-hexanediamines are formed.

The following are illustrative of the hydroxylated diamines that may be prepared according to the process of the invention:

2-hydroxy-1,6-hexanediamine
N,N'-diethyl-2-hydroxy-1,6-hexanediamine
N,N'-dipropyl-2-hydroxy-1,6-hexanediamine
N,N'-dimethyl-2-hydroxy-1,6-hexanediamine
N,N'-diisopropyl-2-hydroxy-1,6-hexanediamine
N,N'-dibutyl-2-hydroxy-1,6-hexanediamine
N,N'-dipentyl-2-hydroxy-1,6-hexanediamine
N,N'-dihexyl-2-hydroxy-1,6-hexanediamine
N,N'-dioctyl-2-hydroxy-1,6-hexanediamine
N,N'-dilauryl-2-hydroxy-1,6-hexanediamine
N,N'-distearyl-2-hydroxy-1,6-hexanediamine
N,N'-dibenzyl-2-hydroxy-1,6-hexanediamine
N,N'-diphenyl-2-hydroxy-1,6-hexanediamine
N,N'-dinaphthyl-2-hydroxy-1,6-hexanediamine
N,N'-ditolyl-2-hydroxy-1,6-hexanediamine
N,N'-diphenethyl-2-hydroxy-1,6-hexanediamine
N,N'-dicyclohexyl-2-hydroxy-1,6-hexanediamine
N,N' - dicyclopentyl - 2 - hydroxy - 1,6 - hexanediamine
N,N,N',N' - tetrapropyl - 2 - hydroxy - 1,6 - hexanediamine
N,N,N'N' - tetrabutyl - 2 - hydroxy - 1,6 - hexanediamine
N,N,N'N' - tetraoctyl - 2 - hydroxy - 1,6 - hexanediamine
N,N' - diethyl - N,N' - diisopropyl - 2 - hydroxy - 1,6 - hexanediamine
N,N' - diphenyl - N,N' - dimethyl - 2 - hydroxy - 1,6 - hexanediamine
N,N' - dibenzyl - N,N' - dipropyl - 2 - hydroxy - 1,6 - hexanediamine The hydroxylated diamines produced according to the invention are of value as improved surface active agents. They also are useful as raw materials for the preparation of products useful for modifying the properties of asphalt emulsions, and as modifying agents or raw materials for the preparation of modifying agents for greases. The hydroxylated diamine which contains two primary amino groups is useful as a resin intermediate; for example, as a component of alkyd-type resins to impart desirable properties thereto, and in the preparation of resins of the polycarboxylic acid polyamide type (nylon). Useful salts of the novel diamines may be prepared by reacting the diamines with organic and inorganic acids, such as the strong mineral acids, organic carboxylic acids, etc.

The following examples will illustrate certain of the specific embodiments of the invention defined in the appended claims.

*Example I*

The reaction vessel was an autoclave suitable for hydrogenation reactions, provided with a mechanical stirrer, the necessary inlets and outlets, and internally located coils through which fluid heating and cooling media could be passed in heat exchange with the contents of the vessel. Seventy-five grams of Raney nickel catalyst were placed in the vessel, and 520 grams of liquid anhydrous ammonia were added. The vessel was closed from the atmosphere, and hydrogen gas under pressure was added until the total pressure in the vessel reached 1000 pounds per square inch.

A neutral aqueous solution of alpha-hydroxyadipaldehyde containing 195 grams of the dialdehyde and about 400 grams of water (equivalent to a molar ratio of the dialdehyde to ammonia about 1:20) was pumped under pressure into the autoclave, at a rate of about 12 milliliters per minute, the addition requiring about 47 minutes. During the addition of the dialdehyde the temperature of the mixture in the reaction vessel was kept between 80° and 90° C., and the mixture was kept well agitated. After all of the solution of the dialdehyde was added, the mixture was allowed to stand at about 85° C. with agitation for an additional hour and a quarter. Throughout the addition of the solution of the hydroxy dialdehyde and during the subsequent period, hydrogen was added to the autoclave as required to maintain the total pressure between 800 and 1000 pounds per square inch.

The resultant mixture was withdrawn from the autoclave, the catalyst was filtered off, and water was removed by evaporation on a steam bath. The residue, weighing 251 grams, was rapidly distilled from a Claisen flask, and then was fractionally distilled. A fraction distilling between 85° and 120° C. under a pressure between 1 and 2 millimeters of mercury, amounting to 45% by weight of the distilland was separated. The fraction crystallized upon standing at room temperature. It was redistilled, and the portion distilling between 126° and 127° C. under a pressure of 3 millimeters of mercury was separated. The thus separated portion, consisting of essentially pure 2-hydroxy-1,6-hexanediamine, was found to have the following analyses and characteristics: Refractive index ($n$ 20/D) 1.4918; melting point, 30–35° C.; melting point of the benzoate, 163° to 164° C.; total amino nitrogen (by titration with hydrochloric acid), 1.47 equivalents per 100 grams (theory, 1.50); primary amino nitrogen, 1.46 equivalents per 100 grams (theory, 1.50); elemental analyses, 54.3% C, 11.9% H, 19.8% N (theory for $C_6H_{16}N_2O$, 54% C, 12.2% H, 21.2% N).

The adipic acid salt of the 2-hydroxy-1,6-hexanediamine was prepared by reaction between the hydroxydiamine and an equimolar amount of adipic acid in boiling ethanol and found to melt after recrystallization at 184–5° C. (with decomposition).

During the initial distillation, the fraction distilling between 120° and 149° C., under 1 to 2 millimeters of mercury was separated. It was found by analyses to consist essentially of a mixture of aminodihydroxyhexanes which contained essentially only primary amino groups. This mixture appeared to have potential value for use in modification of drying oils or, in the form of its long-chain fatty acid salts, as a surface active agent.

*Example II*

Seventy-five grams of Raney nickel catalyst and 765 grams of liquid ammonia were placed in the autoclave used in the foregoing example, and hydrogen gas was introduced until the total pressure reached 1000 pounds per square inch. A solution of 117 grams of alpha-hydroxyadipaldehyde in about 250 millimeters of water then was added to the autoclave at a constant rate over 15 minutes, while the temperature of the mixture in the autoclave was kept between about 80° and 90° C. After an additional period of 85 minutes, during which time hydrogen was added as required to maintain the total pressure between 800 and 1000 pounds the mixture was removed from the autoclave. After separation of the catalyst and water, as in the preceding example, the residue was rapidly distilled from a Claisen flask and then redistilled. The following fractions were separated:

|   | Boiling range, under 1–2 mm. Hg pressure | Amount, percent by weight of distilland | Refractive index ($n$ 20/D) |
| --- | --- | --- | --- |
| A | to 104° C | 18 | 1.4988 |
| B | 104° to 118° C | 37 | 1.4960 |
| C | 118° to 143° C | 29 | 1.5058 |

The crude reaction products after removal of water and the excess ammonia were a water-soluble, yellow to brown viscous liquid which darkened during the Claisen distillation. The distillates from the Claisen distillation yellowed only slightly during the subsequent fractional distillation. Fraction B, above, crystallized upon standing at room temperature, and was found by analyses to be the desired 2-hydroxy-1,6-hexanediamine. Fraction C was found by analysis to be a mixture of aminodihydroxyhexanes similar to the higher boiling fraction described in the preceding example.

*Example III*

The procedure of Example I was followed, employing however a temperature of 110° to 130° C., a total pressure of 1000 to 1200 pounds per square inch, and a total reaction time of 80 minutes. The reaction mixture was worked up similarly and distilled from a Claisen flask. Upon fractional distillation of the Claisen distillate, the 2-hydroxy-1,6-hexanediamine fraction was separated in an amount corresponding to 36% by weight of the distilland.

*Example IV*

N,N' - diisopropyl - 2 - hydroxy - 1,6 - hexanediamine was formed by simultaneous reaction between alpha-hydroxyadipaldehyde, isopropylamine and hydrogen according to the method illustrated in the previous examples. The substituted diamine was recovered as the fraction distilling at 107° to 108° C. at a 1 to 2 mm. of mercury and having a refractive index (N 20/D) of 1.4645.

Example V

There were placed in the autoclave used in Example I, 10.4 gram moles of ammonia in the form of a 28% aqueous solution, and 50 grams of Raney nickel catalyst. Hydrogen then was led into the autoclave until a total pressure of 900 pounds per square inch was reached. A solution of 2 gram-moles of alpha-hydroxyadipaldehyde in about 400 milliliters of water then was introduced into the autoclave at a rate of about 10 milliliters per minute, while the temperature of the reaction mixture was kept at about 80° C. Hydrogenation was rapid and was apparently complete 50 minutes after addition of the solution of dialdehyde. The crude products, after removal of the catalyst and of water and excess ammonia, were distilled from a Claisen flask and then fractionally distilled. The fraction which, by its boiling range, would have contained 2-hydroxy-1,6-hexanediamine, amounted to about 13% by weight of the distilland. In further contrast to the results that were observed in the experiments described in the preceding examples, in this experiment the higher boiling products, that is, the products boiling during the distillation above 125° C. consisted essentially of hydroxylic secondary aliphatic amines containing a large proportion of heterocyclic products. Unlike the higher boiling products that were produced in the preceding examples, the higher boiling products in this experiment contained as much as 30 per cent of the oxygen in a form unavailable for esterification reactions. Similar results were observed when anhydrous liquid ammonia was employed in place of the concentrated aqueous ammonia solution.

Example VI

As shown in this experiment, attempts to hydrogenate a previously prepared mixture of alpha-hydroxyadipaldehyde and ammonia have led to no detectable conversion to 2-hydroxy-1,6-hexanediamine. In this experiment, ninety-one grams of concentrated aqueous ammonia (containing 1.5 moles $NH_3$) was mixed with 168 grams of an aqueous solution of alpha-hydroxyadipaldehyde containing about 0.5 mole of the aldehyde. Raney nickel catalyst, about 20 grams, was added, and hydrogenation was attempted. No hydrogen absorption occurred at 50° C, and 1300 pounds per square inch hydrogen pressure. When the hydrogenation vessel was opened, the only product formed was found to be a white, rubbery, water-insoluble polymer.

This application is a continuation-in-part of our copending application Serial No. 694,144, filed August 30, 1946, wherein there is disclosed, inter alia, a process suitable for the making of hydroxylated long-chain aliphatic dialdehydes, inclusive of alpha-hydroxyadipaldehyde, and to which reference is hereby made.

We claim as our invention:

1. In a process for the production of amines by condensation of a saturated aliphatic dialdehyde wherein the two formyl groups are separated by an uninterrupted chain of at least four carbon atoms, said dialdehyde containing a total of from six to twelve carbon atoms, with an amino compound of the group consisting of ammonia and the primary and the secondary alkylamines and hydrogen, the method of producing acyclic saturated diamines which comprises gradually introducing the saturated aliphatic dialdehyde into a confined reaction zone containing the amino compound in excess compared on a stoichiometric basis to the dialdehyde, molecular hydrogen under pressure, and a hydrogenation catalyst and controlling the rate of introduction of the dialdehyde at a rate not substantially greater than the rate of conversion of the dialdehyde in the ensuing condensation with the amino compound and hydrogen.

2. In a process for the production of amines by condensation of an aliphatic dialdehyde with an amino compound of the group consisting of ammonia and the primary and the secondary alkyl- amines and hydrogen, the method of producing acyclic saturated diamines which comprises gradually introducing a saturated aliphatic dialdehyde wherein the two formyl groups are separated by an uninterrupted chain of at least four carbon atoms, said dialdehyde containing a total of from six to twelve carbon atoms, into a confined reaction zone containing an amino compound of the group consisting of ammonia and the primary and the secondary alkylamines, molecular hydrogen and a hydrogenation catalyst at a temperature between about 30° C. and 150° C., the amino compound being present in an amount equivalent to at least ten moles per mole of the dialdehyde, the dialdehyde being introduced at a controlled rate not substantially greater than the rate of conversion thereof in the condensation with the amino compound and hydrogen.

3. In a process for the production of amines by condensation of a saturated aliphatic dialdehyde wherein the two formyl groups are separated by an uninterrupted chain of at least four carbon atoms, said dialdehyde containing a total of from six to twelve carbon atoms, with ammonia and hydrogen, the method of producing acyclic saturated diamines which comprises gradually introducing the saturated aliphatic dialdehyde into a confined reaction zone containing ammonia in excess compared on a stoichiometric basis to the dialdehyde, molecular hydrogen and a hydrogenation catalyst at a temperature of from about 30° C. to 150° C. and a pressure from about 200 pounds per square inch to about 5000 pounds per square inch while controlling the rate of introduction of the dialdehyde at a rate not substantially greater than the rate of conversion of the dialdehyde in the ensuing condensation with the ammonia and hydrogen.

4. In a process for the production of amines by condensation of monohydroxyadipaldehyde with an amino compound of the group consisting of ammonia and the primary and the secondary alkylamines and hydrogen, the method of producing acyclic hydroxy amines which comprises gradually introducing the monohydroxyadipaldehyde into a confined reaction zone containing the amino compound in excess compared on a stoichiometric basis to the monohydroxyadipaldehyde, molecular hydrogen, and a hydrogenation catalyst at a temperature of from about 30° C. to about 150° C. while controlling the rate of introduction of the monohydroxyadipaldehyde at a rate not substantially greater than the rate of conversion thereof in the ensuing condensation with the amino compound and hydrogen.

5. In a process for the production of amines by reaction of alpha-hydroxyadipaldehyde and ammonia with hydrogen, the method of producing 2-hydroxy-1,6-hexanediamine which comprises introducing an aqueous solution of alpha-hydroxyadipaldehyde at a controlled rate into a confined reaction zone containing ammonia in excess compared on a stoichiometric basis to the alpha-hydroxyadipaldehyde, molecular hydrogen under pressure and a hydrogenation catalyst at a temperature of from about 30° C. to about 150° C., the rate of introduction of the aqueous solution of alpha-hydroxyadipaldehyde being controlled at a rate not substantially greater than the rate of conversion of the alpha-hydroxyadipaldehyde within said confined reaction zone.

6. In a process for the production of amines by condensation of alpha-hydroxyadipaldehyde with ammonia and hydrogen, the method of producing 2-hydroxy-1,6-hexanediamine which comprises gradually introducing an aqueous solution of alpha-hydroxyadipaldehyde into a confined reaction zone containing ammonia in an amount in moles not less than 20 times the amount of the alpha-hydroxyadipaldehyde, molecular hydrogen, and a hydrogenation catalyst at a temperature of from about 30° C. to about 150° C. under a pressure of from about 200 pounds per square inch to about 5000 pounds per square inch and controlling the rate of introduction of the aqueous solution of alpha-hydroxyadipaldehyde at a rate not substantially greater than the rate of conversion of the alpha-hydroxyadipaldehyde in the ensuing condensation with the ammonia and hydrogen.

RICHARD R. WHETSTONE.
SEAVER A. BALLARD.

References Cited in the file of this patent

UNITED STATES PATENTS

| Number | Name | Date |
| --- | --- | --- |
| 1,790,096 | Jensch | Jan. 27, 1931 |
| 2,176,074 | Jacobson | Oct. 17, 1939 |
| 2,325,586 | Bolton et al. | Aug. 3, 1943 |

FOREIGN PATENTS

| Number | Country | Date |
| --- | --- | --- |
| 467,579 | Great Britain | June 17, 1937 |
| 490,922 | Great Britain | Aug. 16, 1938 |
| 96,657 | Germany | Nov. 22, 1896 |

OTHER REFERENCES

Mignonac, Comptes Rendus, vol. 172, pp. 223–226 (1921).

Preobrazhenskii et al.: "Chem. Ab.," vol. 37, p. 2716.

Degering, "Organic Nitrogen Compounds" (Univ. Lithoprintans, Ypsilanti, Mich., 1945), p. 202, para. 599.